United States Patent [19]
Hodge et al.

[11] Patent Number: 5,346,288
[45] Date of Patent: Sep. 13, 1994

[54] AUTOMOTIVE WHEEL AND COVER ASSEMBLY WITH CUSHIONING BAND

[75] Inventors: Charles F. Hodge, Plymouth; Syed H. Sarmast, Northville; Gerald F. Herbert; Dennis M. Sopko, both of Dearborn Heights, all of Mich.

[73] Assignee: Ford Motor Company, Dearborn, Mich.

[21] Appl. No.: 136,865

[22] Filed: Oct. 18, 1993

[51] Int. Cl.⁵ .............................................. B60B 7/00
[52] U.S. Cl. ............................ 301/37.37; 301/37.35; 301/37.1; 301/37.42
[58] Field of Search ............... 301/37.1, 37.31, 37.32, 301/37.34, 37.35, 37.36, 37.37, 37.42

[56] References Cited

U.S. PATENT DOCUMENTS

| | | |
|---|---|---|
| 2,196,990 | 4/1940 | Hunt .................... 301/37.35 X |
| 2,212,037 | 8/1940 | Lyon . |
| 2,736,610 | 2/1956 | Waite . |
| 2,812,215 | 11/1957 | Waite .................... 301/37.42 |
| 3,092,420 | 4/1960 | Baldwin et al. . |
| 3,265,441 | 6/1966 | Baldwin . |
| 3,333,900 | 4/1966 | Aske, Jr. . |
| 3,397,918 | 1/1967 | Aske, Jr. et al. . |
| 3,397,921 | 2/1967 | Aske, Jr. . |
| 3,436,123 | 4/1967 | Aske, Jr. et al. . |
| 3,517,968 | 10/1968 | Tully et al. . |
| 3,549,204 | 12/1970 | Spisak . |
| 3,554,536 | 1/1971 | Richter . |
| 3,671,076 | 5/1975 | Aske, Jr. . |
| 3,894,775 | 7/1975 | Christoph et al. . |
| 4,291,921 | 9/1981 | Wulf . |
| 4,729,606 | 3/1988 | Narita et al. . |
| 5,031,966 | 7/1991 | Oakey . |

FOREIGN PATENT DOCUMENTS

| | | | |
|---|---|---|---|
| 0149935 | 7/1985 | European Pat. Off. | ......... 301/37.32 |
| 2607447 | 6/1988 | France | ............................. 301/37.37 |

Primary Examiner—Russell D. Stormer
Attorney, Agent, or Firm—Daniel M. Stock; Roger L. May

[57] ABSTRACT

A wheel and cover assembly for an automotive vehicle is provided which includes a road wheel and a cover member aligned road wheel and provides a continuous cushioning member interposed laterally between the cover and the road wheel. The cushioning member is formed as the rubber band L-shaped in cross-section which cooperates with a plurality of circumferentially spaced standoff ribs formed on the laterally inner surface of the cover.

3 Claims, 2 Drawing Sheets

AUTOMOTIVE WHEEL AND COVER ASSEMBLY WITH CUSHIONING BAND

BACKGROUND OF THE INVENTION

In the design of trim parts for automotive vehicle wheels, lightweight flexible materials, such as plastics, are in wide-spread use. Because of the inherent flexibility of the parts fabricated from such materials it is necessary for the automotive designer to give careful attention to the prevention of squeaks and rattles generated at the interface between the plastic wheel trim and the metallic wheels on which the trim is mounted. In many instances, it is possible to effect a connective interface between the wheel trim and the wheel at the point at which styling considerations dictate the wheel trim and wheel being closest proximity. Typical of such designs is that in the common wheel cover situation in which clips or other connecting devices are positioned near the outer periphery of the wheel cover for engagement near the outer periphery of the wheel.

In some instances, however, the connective interface between the wheel and the trim is effected in another position such as radially inwardly toward the hub of the wheel. In such instances, a standoff device is generally formed on the annular surface of the wheel trim projecting toward the wheel to laterally locate and space the wheel trim with respect to the wheel. It is in such designs that squeaks and rattles tend to be experienced as the plastic standoff intermittently engages the adjacent portion of the wheel.

SUMMARY OF THE INVENTION

Responsive to the need to provide a wheel and cover assembly that avoids the generation of squeaks and rattles between the wheel cover and the wheel, the present invention provides a wheel and cover assembly which includes a covering disc which overlies the annular outer face of the wheel and provides a cushion member annularly arrayed on the disc in the form of a band which is abuttingly engagable with the wheel to prevent squeaks and rattles.

According to one aspect of the invention, the band is L-shaped and extends continuously peripherally between the wheel and the cover.

BRIEF DESCRIPTION OF THE DRAWINGS

The aforementioned advantages and features, as well as others, will be clear to those in the automotive wheel trim art on reading the following description with reference to the accompanying drawing, in which.

DESCRIPTION OF THE PREFERRED EMBODIMENTS

Figure 1:
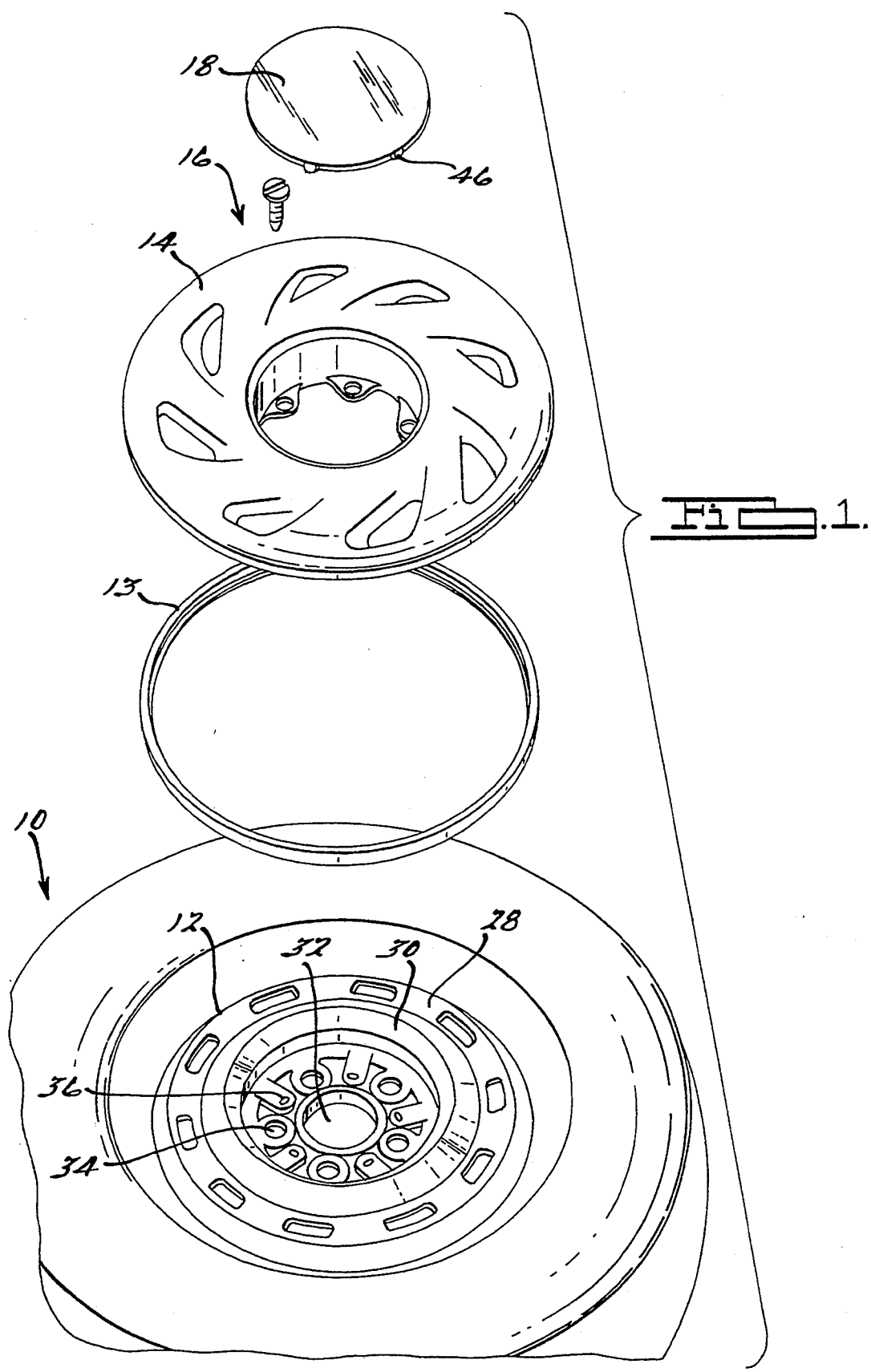
FIG. 1 is an exploded perspective view of the wheel and cover assembly according to the present invention viewed from the lateral outside of the vehicle wheel.

Turning now to drawings, and in particular to FIG. 1 thereof, a wheel and cover assembly indicated generally at 10 is illustrated as including a vehicle road wheel 12, a decorative covering disc 14 engagable in overlying relationship with respect to the road wheel 12, and including a fastening assembly indicated generally at 16 for releasably securing the disc 14 to the road wheel 12. A cushioning band 13 is operatively disposed between the wheel and the cover. The wheel and cover assembly 10 is also illustrated and including a hub cover 18 engagable with the disc 14 to cover the fastening assembly 16.

Figure 3:
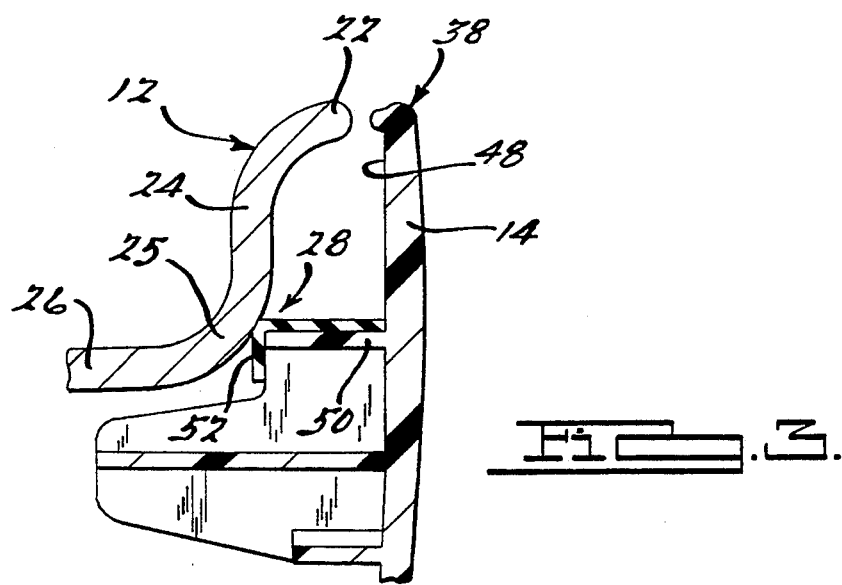
FIG. 3 is a partial cross-sectioned view of the wheel and cover assembly according to the present invention.

As may best be seen in FIG. 3, the road wheel 12 is of the type that includes, near its outer periphery 20, a laterally outwardly turned flange portion 22, a generally annularly extending face portion 24, and an inturned portion 26. Notwithstanding the specific contour of the surfaces 22, 24, 26, collectively for purposes of this invention they are to be considered the laterally outward annular face indicated generally at 28. Also formed on the wheel 12 is a recessed central hub portion indicated generally at 30 through which is formed a central pilot aperture 32, a plurality of stud apertures 34 for mounting the road wheel on the vehicle, and a plurality of trim mounting apertures 36. The trim apertures 36 may be integrally formed with the wheel 12 or may be in the form of an auxiliary member operatively secured to the wheel 12 in a known manner. The apertures are preferably threaded to form a portion of the fastening assembly 16.

The covering disc 14 is an annular disc-like member, preferably formed of a flexible plastic, and includes an outer peripheral portion 38 which overlies the outward turned flange portion 22 of the wheel 12 and is positioned in lateral proximity thereto. Radially inwardly spaced from the outer peripheral portion 38 is a recessed central hub portion 40 having a plurality of radially inwardly extending ears 42 having clearance apertures 44 formed therethrough. The recessed portion 40 is received in the recessed portion 30 of the wheel 12 and the clearance apertures 42 overlie the mounting apertures 36 of the wheel 12. Threaded insertion of a corresponding plurality of fasteners 44 through the apertures 42 into engagement with the apertures 36 effects releasable securement of the disc 14 to the wheel 12 in overlying relationship. The decorative effect of the resulting wheel and cover assembly is enhanced by the insertion of the cover 18 into snap-fit relationship through tabs, as indicated at 46, into the depression 40.

Also included on the disc 14 are a plurality (one shown) of upstanding ribs 58 formed on the laterally inner face 48 of the disc 14.

Figure 2:
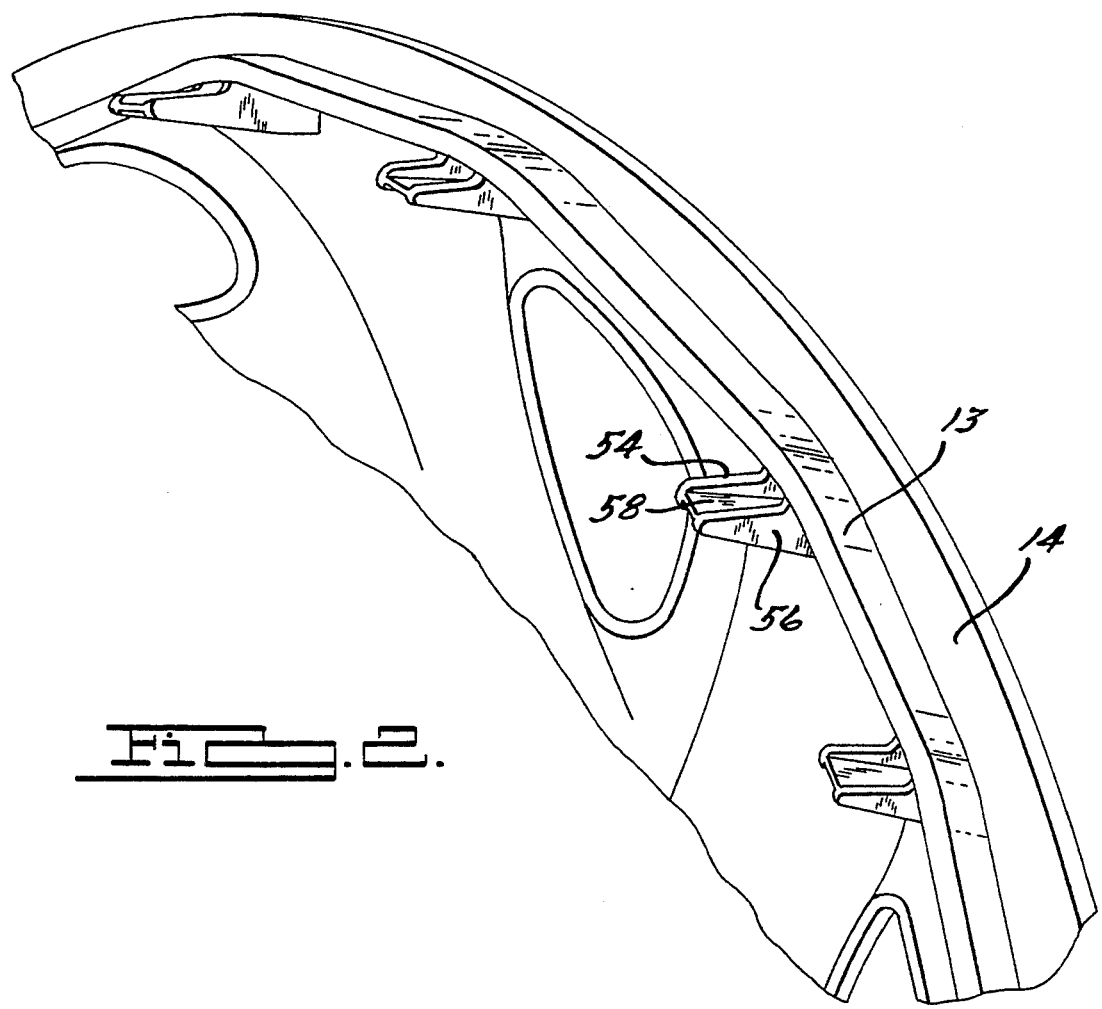
FIG. 2 is a partial perspective view of a wheel and cover assembly according to the present invention viewed from the road wheel toward the cover member.

As may best be seen in FIGS. 2 and 3, the standoff ribs 58 are circumferentially spaced with respect to the cover member and project laterally from its back face 48 toward the wheel 12. Each standoff rib includes a radially outer wall 50 projecting perpendicularly from the laterally inner face 40 of the cover 14 and a annular facing wall 52 having a facing surface generally parallel to the laterally inner face 48 of the cover 14. The facing surface 52, as may best be seen in FIG. 3, is in close juxtaposition with the curved surface 25 of the wheel 12 between surfaces 24 and 26.

A cushioning band 13 is preferably formed from rubber and is of generally L-shape cross-section so that it overlies the radially outer wall 50 as well as the facing surface 52 and prevents squeaks and rattles by providing a cushion between the cover 14 and the wheel 12. Presenting the peripherally continuous cushioning band between the cover 14 and the wheel 12 ensures that contact between the two components is resiliently blocked.

While only one embodiment of the present invention has been shown, others will occur to those skilled in the art which do not depart from the scope of the following claims.

What we claim and desire to secure by U.S. Letters Patent is:

1. A wheel and cover assembly for an automotive vehicle comprising:

a road wheel having an annular laterally outer surface;

a cover member formed as a disc overlying the wheel laterally outer surface and having a laterally inner annular surface facing the wheel, and further including a plurality of circumferentially spaced upstanding ribs projecting perpendicularly from the laterally inner surface, each rib including a radially outer surface extending perpendicularly from the laterally inner surface of the cover member toward the wheel and a facing surface extending radially inwardly and perpendicularly to the radially outer surface; and a resilient cushioning member extending continuously circumferentially and positioned laterally between the road wheel and the cover member and adapted to be compressibly engaged between the rib facing surface and only the wheel laterally outer surface.

2. A wheel and cover assembly as defined in claim 1, wherein the cushion member is a rubber band.

3. A wheel and cover assembly as defined in claim 2, wherein the rubber band is L-shaped in cross-section.

* * * * *